July 18, 1950

D. BARCHOK 2,515,178

MEANS FOR SYNCHRONIZING DETECTION
AND INTERROGATION SYSTEMS

Filed Oct. 12, 1943

*INVENTOR.*
DONALD BARCHOK
BY
*William D Hall.*
*Attorney*

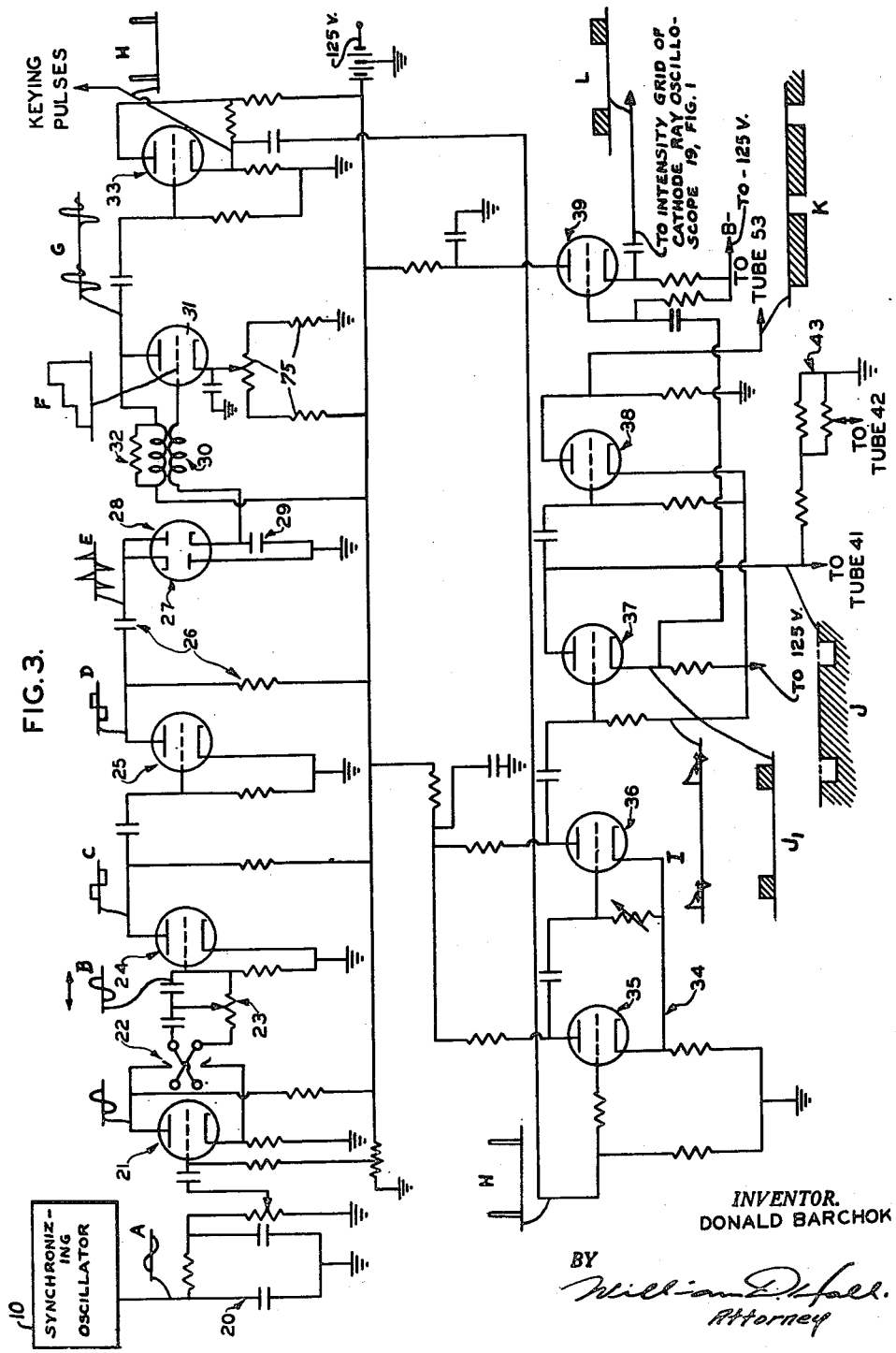

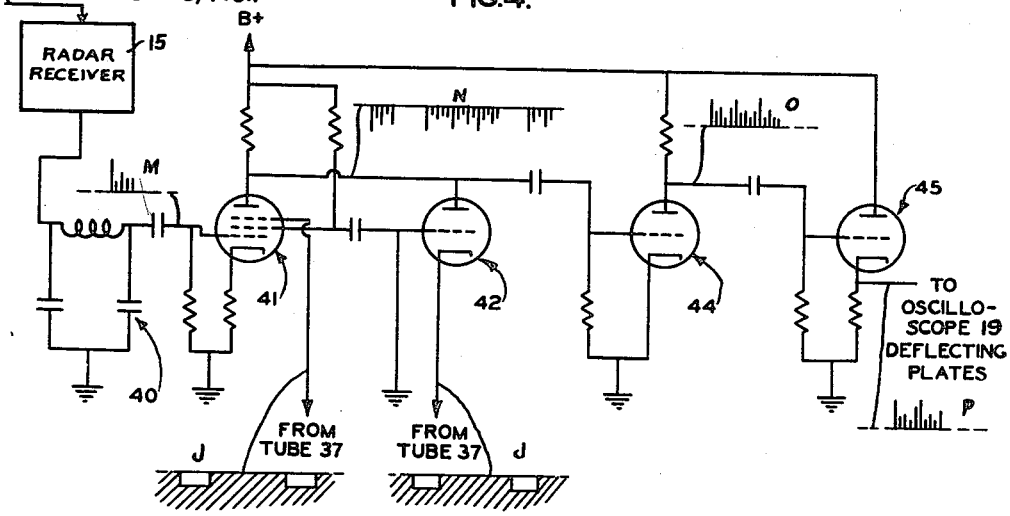
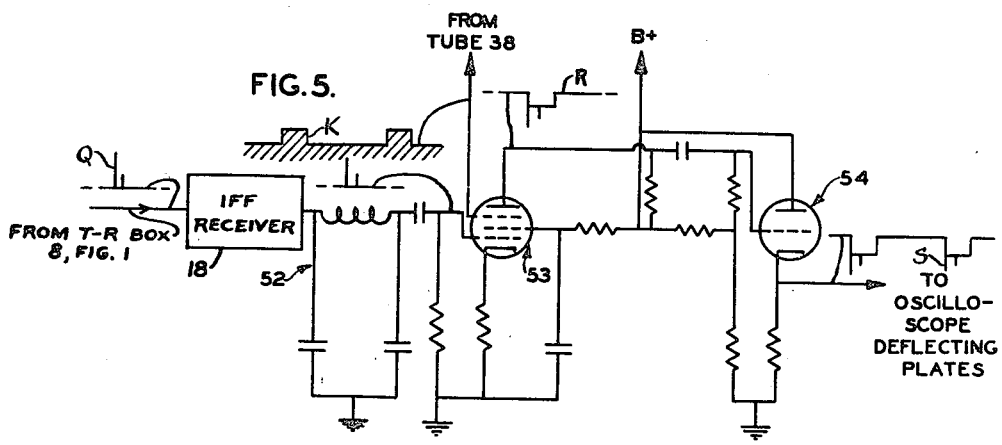
INVENTOR.
DONALD BARCHOK

Patented July 18, 1950

2,515,178

UNITED STATES PATENT OFFICE 2,515,178

MEANS FOR SYNCHRONIZING DETECTION AND INTERROGATION SYSTEMS

Donald Barchok, Wilkes-Barre, Pa., assignor to the United States of America as represented by the Secretary of the Army Application October 12, 1943, Serial No. 505,891

14 Claims. (Cl. 343—6)

(Granted under the act of March 3, 1883, as amended April 30, 1928; 370 O. G. 757)

The invention described herein may be manufactured and used by or for the Government for governmental purposes, without the payment to me of any royalty thereon.

My present invention relates to means for synchronizing the operation of an aircraft detection system with that of an interrogation system whereby the range and identity of detected aircraft may be displayed upon a single oscilloscope.

While not limited thereto, the present invention is particularly well suited for use with the so-called pulse-echo radio system for object detection. According to one form of such system, pulses of high frequency energy are radiated into space at a audio frequency rate, the energy so radiated being caused to scan the area surrounding the detecting station through 360° azimuth. Should said energy encounter an object in space, such as an aircraft, a portion thereof is reflected or reradiated, and the reflected or reradiated energy, known as an echo, is received back at the detecting station where, by measuring the time interval between the original transmission of the energy and the reception of the echo thereof, the distance to the object causing the echo is determined. For the purpose of measuring this time interval, a portion of the originally transmitted energy is usually applied to the vertically deflecting plates of an oscilloscope provided with a horizontal sweep synchronized with the pulse transmission, the pulse transmission appearing, in the form of an upwardly directed pip, at the commencement of the oscilloscope base line. The received echoes are also applied to the vertically deflecting plates of the oscilloscope and appear, in the form of upwardly directed pips, along the length of the base line, the distance between each echo pip and the pip corresponding to the original pulse transmission depending, as is well known, upon the range of the object causing the particular echo. By calibrating the base line in terms of distance, the range of each echo-causing object may be directly read on the oscilloscope screen.

In one form of existing interrogation systems, pulses of high frequency energy, known as challenging or interrogation signals, are radiated into space in directional alignment with the pulse transmission of a detection system such as the one just described. Should this energy be received by an aircraft provided with a special unit known as a transponder, said unit is tripped by such energy and is caused to transmit an identifying message or recognition signal, which is received back at the detecting station to inform those on the ground that the craft transmitting the same is friendly. In order to enable interpretation of the response to the inerrogation signals, including a negative response, the output of a receiver, tuned to the frequency at which the recognition signals are transmitted by the transponder, is applied to the vertically deflecting plates of an oscilloscope provided with a horizontal sweep synchronized with the transmission of the challenging signals. If this oscilloscope fails to display any signals from a craft which has been challenged, those on the ground are informed that that particular craft is hostile, whereas should said oscilloscope display indicia of proper recognition signals, it is determined that the craft transmitting the same is friendly.

It will be noted that the echoes from all craft within the range of the transmitter of the detection system are displayed upon one oscilloscope and that the recognition signals from friendly craft resulting from the challenging signals of the interrogation system are displayed upon another oscilloscope. Attempts have been made to combine these displays on a single oscilloscope but this has resulted in bulky and complicated equipment and the introduction, into the oscilloscope circuits, of undesirable phase shifts.

It is therefore an object of the present invention to provide circuits for combining a detection system with an interrogation system in such manner as to permit the use of a single indicating device, such as an oscilloscope, for determining the range of detected aircraft, and, at the same time, establishing the identity thereof.

It is another object of the present invention to provide circuits for combining detection and interrogation systems wherein any undesirable phase shifts, introduced through any inherent characteristics of the components, may be eliminated.

It is a further object of the present invention to enable the attainment of the above mentioned combination of systems through the use of simple circuits and compact equipment.

These and other objects are attained in the present invention in the following manner: A portion of the power for keying the transmitter 12, Fig. 1. of the detection system is employed to synchronize the keying of the interrogation-transmitter 16 of the interrogation system, the keying rate or the pulse repetition rate of the latter, however, being lower than that of the former. The lower pulse repetition rate in the interrogation system is desirable in order to eliminate the possibility of jamming the airborne unit carried by friendly craft in the event that several installations be directing their challenging signals simultaneously at the same craft.

Provision is made for displacing the base line of an indicating oscilloscope 19 below its normal position as illustrated at 55 in Fig. 2 in synchronism with the pulse transmission of the interrogation system whereby the echoes received from detected craft are displayed, in the form of upwardly directed pips 48, 49, 50, upon the base line 55 while the latter is in its normal position, and recognition signals from friendly craft are displayed, in the form of downwardly directed pips, upon the base line while the latter is in its displaced position. A portion of the energy developed for keying the interrogation system transmitter 16 is utilized to block in alternate succession incoming echo signals from the oscilloscope during the application thereto of recognition signals and to block incoming recognition signals from said oscilloscope during the application thereto of echo signals.

The pips 47 and 56 which are the visual images of the original transmitted exploratory and interrogation signals of both the detection and interrogation systems are initially vertically aligned as illustrated in Fig. 2. Therefore, the pips 49 and 57 corresponding to the radar echo (49) and recognition signals (57) received from friendly craft will appear in vertical alignment with the corresponding echo indications of said craft, thereby positively identifying all of the craft whose echo pips appear on the normal base line of the oscilloscope.

Finally, a portion of the interrogation keyer energy is utilized to intensify the oscilloscope trace in synchronism with the pulse transmission of the interrogation system in order that the friendly signals on the displaced base line, which repeat at a lower rate than the echoes on the normal base line, will be of the same visibility as said echoes.

In the accompanying specification I describe and the annexed drawings show one form of combined detection and interrogation systems which may be used to attain the foregoing objects. It is, however, to be clearly understood that said embodiment is set forth merely by way of illustration, and is not intended to limit the true spirit and scope of the present invention as expressed in the appended claims.

In said drawings,

Figure 3 is a schematic diagram of a circuit for synchronizing the transmission of the interrogation system with that of the detection system, for generating blocking voltages, and for intensifying the oscilloscope trace in synchronism with the transmission of the interrogation system;

Figure 4 is a schematic diagram of an echo-blocking circuit; and

Figure 5 is a schematic diagram of a recognition signal-blocking circuit.

Figure 1:
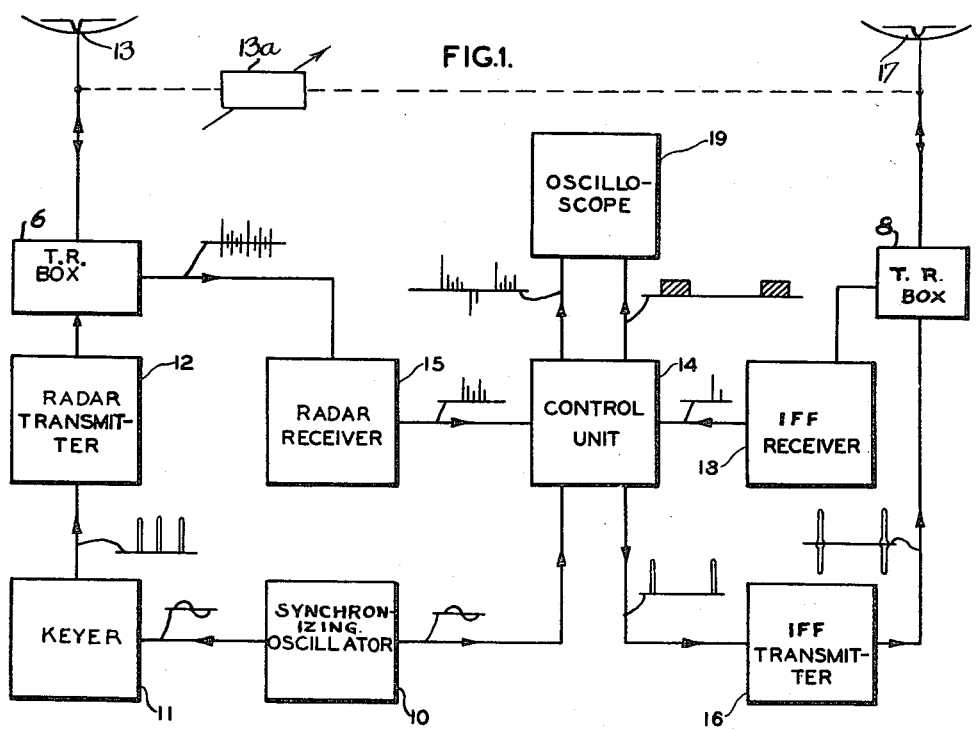
Figure 1 is a block diagram of a combined detection and interrogation system, assembled in accordance with the principles of the present invention.

Referring to Figure 1 a synchronizing oscillator 10 generates a sine wave voltage whose frequency is determined by the maximum range to be covered by the detection system. The output of the oscillator is impressed on a keyer 11, which keys a radar transmitter 12. The transmitter generates high frequency exploratory pulses which are radiated by a directional antenna 13 adapted to be rotated through 360° for scanning the area surrounding the radar station.

The output of oscillator 10 is also impressed on a control unit 14 which synchronizes the operation of the two systems and acts as an electronic switch enabling the display of the radar and the IFF (identification friend or foe) signals on the screen of a single oscilloscope 19.

The radar echoes are picked up by antenna 13, detected by a receiver 15, and are impressed on control unit 14. The transmitter 12 and receiver 15 are connected to antenna 13 through a "T-R box" 6 comprising a coaxial transmission line with quarter wave length stubs terminating in gas-filled tubes which are conductive during transmitting cycle and non-conductive during receiving cycle; flashing of the gas-filled tubes by high voltage of the transmitter makes impedance looking into the receiver very high during transmitting cycles so that practically the entire transmitted energy is directed to the antenna and only an insignificant amount reaches the receiver. At the cessation of the transmitting cycle the high voltage is removed and the open gas-filled tubes open the quarter wave length stubs which now transform the impedance looking into the transmitter from the transmitter-receiver junction point of the concentric line into a short-circuit and therefore the received energy is directed to the receiver and no significant amount of the received energy is dissipated in the transmitter. For a more detailed description of the T-R boxes, which do not represent a part of this invention, reference is made to page 9 of the Second Edition (August 1943) of "Practical Analysis of Ultra-High Frequency Transmission Lines, Resonant Sections, Resonant Cavities and Wave Guides," by J. R. Meagher and H. J. Markley, published by RCA Service Company, Inc., Camden, New Jersey.

The output of oscillator 10 impressed on control unit 14 is utilized therein to synchronize the keying of an interrogation transmitter 16 with the keying of the radar transmitter 12, but the keying rate of the interrogation transmitter is reduced in order to prevent overloading of the airborne units carried by friendly craft in the event several ground installations be directing their challenging signals at the same craft at the same time.

The interrogation transmitter 16 is designed to generate high frequency pulses which are radiated into space by a directional antenna 17 so mechanically coupled to the antenna 13, as shown at 13a, that the radiations from both antennae are in directional alignment.

The challenging signals from transmitter 16 are intended to be received by friendly craft equipped with a unit known as a transponder not illustrated in Fig. 1. This unit is automatically triggered by the interrogation signals to transmit an identifying message or recognition signal which is picked up by antenna 17 and detected by a receiver 18. The output of this receiver, as in the case of receiver 15, is impressed on control unit 14, and the transmission lines to antenna 17 are preferably provided with a "T-R box" 8, similar to "T-R box" 6 whereby receiver 18 is protected against severe overloading during the transmitting cycle of transmitter 16.

Control unit 14, receives the outputs of both receivers 15 and 18, and alternately impresses them on the vertically deflecting plates of an oscilloscope 19, the oscilloscope being provided with a conventional horizontal sweep synchronized with the pulse transmission of the radar system.

Thus, control unit 14 includes 3 channels, shown in Figures 3, 4, and 5, respectively receptive of a portion of the sine wave output of the oscillator 10, echo pulses from all craft within the area scanned by the high frequency exploratory pulses from the transmitter 12, and friendly signals from craft provided with an airborne unit triggered by the high frequency energy from trransmitter 16.

Referring now to the channel, shown in Figure 3 which generates the keying pulses for transmitter 16, the keying pulses for the receivers 15 and 18 and the intensity grid signals for oscilloscope 19, a sine wave voltage, is impressed, through a filter network 20, on a buffer amplifier 21 which amplifies the sinusoidal wave. The plate circuit of said tube includes a reversing switch 22 and an RC phase-shifting network 23 whereby the phase of the output may be altered by almost 360°. By properly adjusting the switch 22 and phase-shifting network 23 the output shown at B or an output of any intermediate phase may be obtained. The purpose of this adjustment is to permit cophasing and the initial vertical alignment of the two transmitted pulses 47 and 56, Fig. 2 on the screen of the oscilloscope.

The sinusoidal wave B is applied to the grid of a triode 24 which acts as an overdriven amplifier whose output is illustrated at C. Wave C is impressed on a triode 25, which also acts as an overdriven amplifier, so that the output thereof is a substantially square wave D. The square wave output of this tube is passed through a differentiating network 26, whose output is illustrated at E, and thence to the cathode and plate of a pair of diodes 27 and 28 inverted with respect to each other. The plate of the diode 27 is directly connected to ground and the cathode of the diode 28 is connected to ground through a capacitor 29. By means of this arrangement the negative pulses generated by the network 26, are shunted to ground, whereas the positive pulses step charge a condenser 29 as shown at F.

The voltage across the capacitor 29 is applied through a secondary 30 to the grid of a triode 31; the primary of this transformer is connected between +B bus and the plate of triode 31 for impressing positive feed-back on the grid of triode 31. The cathode of triode 31 is biased above ground by means of a potentiometer 75. The tube 31 remains nonconducting until the potential across capacitor 29 becomes sufficiently high to overcome said bias, whereupon said tube becomes conducting. Because of the feed-back through the transformer windings 32, 30, triode 31 is set into one cycle of oscillation, its grid draws current, and capacitor 29 is discharged through the cathode-to-grid circuit of triode 31. The result is a negative-positive pulse G, the repetition rate of which is a fraction of that of the radar system. The twin diode 27—28 and triode 31 act as a frequency-reducing circuit, with triode 31 acting as a well-known blocking oscillator.

This output of reduced frequency is impressed on a triode 33 which is so biased as to clip the negative half-cycles, resulting in a cathode output consisting of positive pulses H, which are employed for keying the interrogation transmitter 16, (Fig. 1). The repetition rate of transmitter 16, therefore, depends on the parameters of the frequency-reducing circuit 28—31.

A portion of the output of triode 33 is employed to trigger a one-shot multi-vibrator 34 including a pair of vacuum tubes 35 and 36, the width of the square wave output I of which may be controlled by varying the time constant of the coupling between the tubes. The width should be adjusted so as to block echo pulses from the oscilloscope during the periods corresponding to the application to said oscilloscope of recognition signals, and block recognition signals from said oscilloscope during the periods corresponding to the application thereto of echo signals.

The output of the multivibrator 34 is applied to an inverter 37 connected to provide a negative square wave J in its plate circuit, and a positive square wave $J_1$ in its cathode circuit. The plate output is employed, as will be described later, to block sequentially the radar echo receiving and the IFF recognition receiving channels connected to the control unit 14 in accordance with the ratio of the pulse rates of the radar and the IFF systems. The cathode output is employed, as will be described later, to increase the intensity of the oscilloscope trace in synchronism with the reception and reproduction of the IFF signals on the screen of oscilloscope 19.

The negative rectangular wave J, appearing in the output of inverter 37 is impressed on the grid of a triode 38 which acts as an inverter for the output of triode 37. The cathode output of triode 37 is impressed on a triode 39. Triodes 37 and 38, together with pentodes 41 and 53, Figs. 4 and 5, represent an electronic switch the rectangular waves of which, appearing in the plate circuits of the triodes 37 and 38, are impressed directly on the suppressor grids of the pentodes 41 and 53 respectively, making these pentodes alternately responsive to the radar echo and the IFF signals. To obtain positive keying of the pentodes and to avoid impressing of the rectangular waves per se on the vertical deflection plates of the oscilloscope, it is preferable to have their suppressor grids connected directly to the plates of triodes 37 and 38. To make this possible the cathodes are connected to a —125 v. terminal which is below ground potential, and the plates are normally maintained at ground potential. The plate output of triode 38 is a square wave K. The cathode output of triode 39, also a positive square wave L, is applied to the intensity grid of the oscilloscope 19 (Fig. 1) to intensify the trace of the oscilloscope sweep in synchronism with the pulse transmission of the interrogation system.

I shall now describe the radar echo-receiving channel of the control unit 14, shown in Figure 4. The output of the radar receiver 15, comprising the positive pulses, is applied, through a filter network 40, to the control grid of a pentode 41. This pentode is biased just above cutoff and the suppressor grid thereof is receptive of a portion of the plate output of the tube 37 (Fig. 3). Inasmuch as the plate output of the tube 37 consists of the negative square wave J synchronized with the reception of the IFF signals, the tube 41 is periodically blocked and the plate output N, consists of groups of negative radar echo signals spaced by periods corresponding to the time of the reception and application of the IFF recognition signals from friendly craft to the vertically deflecting plates of oscilloscope 19.

In order further to counteract the pedestaling effect introduced into the plate circuit of the tube 41 by the application of the negative square wave to the suppressor grid of said tube, the output is combined with the plate output of a vacuum tube 42, the grid of which is grounded (it operates as a D. C. diode restorer) and the cathode of which is receptive of a portion of the output of the tube 37 (Fig. 3). The amplitude of the negative square wave voltage applied to the cathode of the tube 42 is controlled by a potentiometer 43 (Fig. 3). Thus, although the application of the negative square wave to the suppressor grid of pentode 41 raises the potential on the plate thereof, the application of a portion of the same negative square wave to the cathode of the tube 42 increases the current flow in said tube 42 and reduces the potential on the plate thereof, so that by adjusting the potentiometer 43 (Fig. 3) the drop in the plate potential on the tube 42 may be made sufficient to counteract the aforesaid pedestaling effect. Triode 42 thus acts as a well-known D. C. restorer.

The combined outputs of the tubes 41 and 42 are applied to the grid of an inverter 44 whose inverted output O is applied to a cathode follower 45 whose output P, comprising groups of positive pulses corresponding to radar echo signals, spaced by the periods corresponding to the reception of the IFF signals, as shown in Figure 6—P, is applied to the vertical deflecting plates of the oscilloscope 19, (Fig. 1).

Figure 2:
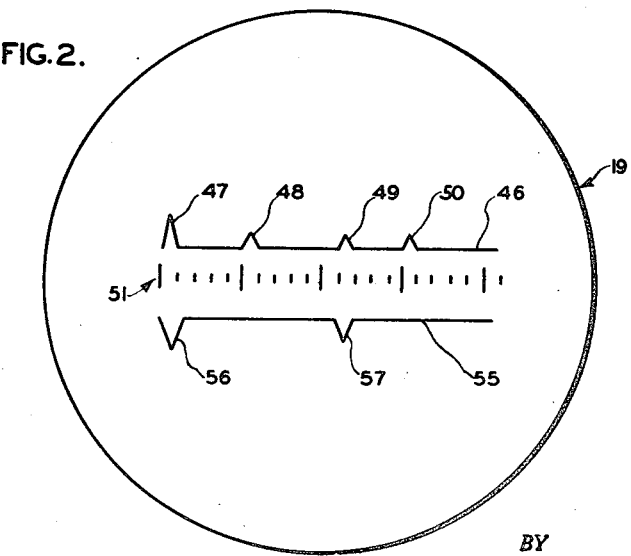
Figure 2 is a typical oscilloscope picture showing the presence of both hostile and friendly aircraft.

Therefore, as shown in Figure 2, there appears upon the normal base line 46 of the oscilloscope 19, an upwardly directed pip 47, at the commencement thereof, corresponding to the pulse transmission of the radar system, and, for example, upwardly directed pips 48, 49, and 50 corresponding to the echo signals received from three objects at different ranges from the radar station. If desired, the screen of the oscilloscope may be marked with a scale 51 to enable direct reading of the range of each echo-causing object having a pip appearing upon the normal base line.

I shall now describe the IFF recognition signal channel of the control unit 14 as shown in Figure 5. The input to this channel, consisting of positive pulses Q from airborne transponders, triggered by the pulse transmission of the interrogation system, is applied, through a filter network 52, to the control grid of a pentode 53. This pentode is normally biased beyond cut-off and its suppressor grid is connected to the positive square wave output of the plate circuit of triode 38, (Fig. 3); the positive square waves make pentode 53 responsive to the IFF signals Q which are impressed as negative signals R on the grid of a cathode follower 54. As illustrated at R the IFF signals are "pedestalled" on the rectangular wave, which is accomplished by adjusting the amplitude of the rectangular wave K impressed on the suppressor grid of pentode 53. The output S of cathode follower 54, is applied to the vertically deflecting plates of oscilloscope 19 with the result that its normal base line is periodically displaced to the position of the lower line 55 in Figure 2, which has applied thereto, at the commencement thereof, a downwardly directed pip 56 corresponding to the IFF transmitted pulse and a downwardly directed pip 57 corresponding to the recognition signal received from the friendly craft which also produced echo image 49 along the upper base line 46.

By adjusting the phase shifter 23, Fig. 3, the pip 56 may be moved and adjusted to be in vertical alignment with the oppositely directed pip 47 corresponding to the transmitted radar pulse. When said pips are so vertically aligned, the recognition signal pips will appear in vertical alignment with the echo-indicating pips caused by craft whose ranges correspond with the range of the craft transmitting the friendly signals under observation. Therefore, and as may be seen from the example shown in Figure 2, it is determined that the craft causing the echo pips 48 and 50 are hostile whereas the craft causing the pip 49 is friendly.

I have thus described a means for combining a radar system with an IFF interrogation system whereby the range and identity of any detected craft may be determined from a single indicating device.

It is to be noted that this general object has been attained through the use of relatively simple circuits and compact equipment, and it is to be further noted that any undesirable phase differences between the two systems can be compensated very readily by means of an auxiliary phase shifter.

I claim:

1. A radar system including a radar transmitter periodically transmitting exploratory pulses, a radar receiver for receiving echoes of said exploratory pulses, a control unit connected to said radar receiver, an interrogation transmitter connected to and controlled by said control unit for periodically transmitting interrogation pulses, an interrogation receiver for receiving recognition signals, the output circuit of said interrogation receiver being connected to said control unit, a cathode-ray oscilloscope having a beam-deflecting means connected to said control unit, said control unit including an electronic switch for alternately connecting the outputs of said receivers to said beam deflecting means, and a source of rectangular pulses combined with said recognition signals whereby said echoes and said signals are reproduced as visual images on the screen of said oscilloscope along two base lines.

2. A radar system including a synchronizing oscillator, a radar transmitting channel connected to and controlled by said oscillator to transmit exploratory pulses, a radar receiver for receiving echo signals of said exploratory pulses, a cathode-ray oscilloscope, a control unit interconnecting said radar receiver and said oscilloscope, an interrogation transmitter connected to and controlled by said oscillator through said control unit to transmit interrogation pulses, an identification receiver for receiving identification signals in response to said identification pulses, said interrogation receiver impressing said identification signals on said control unit, said control unit having a source of pulses co-phased with the appearance of said echoes and identification signals at said control unit for making said unit alternately responsive to said signals and for alternately impressing said signals on said oscilloscope for alternately reproducing said radar echo signals along one base line and said identification signals along another base line.

3. A radar system including a synchronizing oscillator, radar transmitting and receiving channels, said transmitting channel periodically transmitting radar exploratory pulses and said radar receiving channel receiving radar echoes of said exploratory pulses, the periodicity of said exploratory pulses being controlled by said synchronizing oscillator, an interrogation transmitter connected to and controlled by said radar transmitting channel for periodically transmitting interrogation pulses, an identification receiver receiving identification signals originating in response to said interrogation pulses, a control unit connected to said radar and identification receivers, and an oscilloscope connected to the output of said control unit, said control unit having an electronic switch and a source of switching pulses for sequentially impressing said radar echoes, said identification signals and a portion of said switching pulses on said oscilloscope for reproducing said radar echoes along one base line and said interrogation signals along another base line.

4. A control unit for a radar system having a radar receiver, an interrogation transmitter and an identification receiver all connected to said unit, said unit including a first means for keying said transmitter, a source of switching pulses and a switch connected to the outputs of said receivers for alternately blocking said receivers, an oscilloscope including first and second beam-deflecting means and a saw-tooth oscillator connected to said first beam-deflecting means for producing a base-line on the screen of said oscilloscope and a connection between said second beam deflecting means, and the output of said switch, the output of one receiver being combined with corresponding switching pulses at said switch for shifting the position of said base-line, whereby the signals from one receiver are reproduced along one base line, and the signals from the other receiver are reproduced along the shifted base line.

5. A control unit as defined in claim 4 which also includes an intensity grid in said oscilloscope, and a connection between said second means and said intensity grid, said second means impressing a positive signal on said grid during the interval of time allotted by said second means for the reception of signals by said oscilloscope from said interrogation receiver.

6. A control unit as defined in claim 4 in which said second means also includes an additional means for adjusting the time of alternately blocking said receivers.

7. A control unit as defined in claim 4 in which said second means includes a first network for adjusting the time of alternately blocking said receivers, and a second network for adjusting the duration of time when either of said receivers is maintained in blocked condition.

8. A radar system including a synchronizing oscillator, a radar transmitting channel keyed by said oscillator to transmit a single exploratory pulse for each oscillatory cycle of said oscillator, a radar receiving channel for receiving echoes of said exploratory pulse, a phase shifter connected to said oscillator, a frequency divider connected to said phase shifter, a pulse forming circuit interconnecting said frequency divider and an interrogation transmitter, the latter transmitting interrogation pulses whose periodicity is controlled by said pulse forming circuit, an electronic switch controlled by the output of said pulse-forming circuit, identification receiver for receiving identification signals originating in response to said interrogation pulses, the outputs of said radar and identification receivers being impressed on said electronic switch, said switch being actuated by a source of switching pulses for alternately blocking the outputs of said receivers, and an oscilloscope connected to said electronic switch and said source for reproducing said echoes along one base line and said identification signals along another base line.

9. A radar system as defined in claim 8 in which said phase shifter includes means for aligning on said base lines the image of the echoes with the image of the identification signal corresponding to said object.

10. A radar system including a radar transmitter periodically transmitting exploratory pulses, a radar receiver for receiving echoes of said exploratory pulses, an interrogation transmitter, means interconnecting said interrogation transmitter with said radar system, said means controlling the transmission of interrogation pulses by said interrogation transmitter, an identification receiver for receiving identification pulses in response to said interrogation pulses, an oscilloscope having a cathode-ray tube with first and second deflection means, an electronic switch connected to and controlled by said radar system, the outputs of said radar and identification receivers being connected to said switch, a connection between the output of said switch and said first deflection means, a sawtooth generator connected between said second deflection means and said radar system, said radar system timing said generator, and a source of substantially rectangular waves connected to said first deflection means through said electronic switch, whereby said echoes and said identification signals are reproduced respectively on the screen of said cathode-ray tube as visual images along two displaced base-lines.

11. A radar system including a radar transmitting channel periodically transmitting exploratory pulses, a radar receiver for receiving echoes of said exploratory pulses, an interrogation transmitter connected to and synchronized with said transmitting channel, said interrogation transmitter transmitting interrogation pulses, an identification receiver for receiving identification signals in response to said interrogation pulses, an electronic switch connected to the outputs of said radar and interrogation receivers, a source of keying pulses connected on its input side to said transmitting channel and on its output side to said switch for actuating said switch, and a cathode ray tube having a screen and first and second deflecting means, said first means being connected to a source of sweep voltage producing a sweep and a base-line on said screen, and said second deflecting means being connected to the output of said switch and, through said switch, to said source, said source periodically, and in phase with the appearance of said echoes and said identification signals at said output, shifting said base-line with every other keying pulse, whereby said echoes and said signals are reproduced along two respective, displaced base-lines on said screen.

12. A radar system including, a radar transmitting channel periodically transmitting exploratory pulses; a radar receiver for receiving echoes of said exploratory pulses; a control unit having an electronic switch; an interrogation transmitter connected to said control unit; first means, within said control unit, connected on the input side to said transmitting channel and on the output side to said switch and said interrogation transmitter, said first means generating switching and synchronizing pulses, said switching signals actuating said switch and said synchronizing pulses timing periodic transmission of interrogation pulses by said interrogation transmitter; an identification receiver for receiving identification signals in response to said interrogation pulses, the outputs of said radar and identification receivers being connected to said electronic switch; a cathode-ray oscilloscope having a screen and first and second beam-deflecting means; a source of sweep waves, connected to and controlled by said transmitting channel, for producing a base-line on the screen of said oscilloscope; and a connection between said second means and the output of said electronic switch and, through said switch, with said source of switching signals, one of said switching signals periodically shifting said base-line for reproducing said echoes as visual images on said screen along a first base-line and said identification signals along a base-line displaced with respect to said first base-line.

13. A radar system as defined in claim 12 in which said first means includes a frequency dividing circuit for reducing the repetition rate of said interrogation transmitter as compared to the repetition rate of said radar transmitting channel.

14. A radar system as defined in claim 12 in which said first means includes a phase shifter and a network for adjusting the duration of said switching pulses for cophasing said switching signals with respective duty cycles of said radar and identification receivers.

DONALD BARCHOK.

REFERENCES CITED

The following references are of record in the file of this patent:

UNITED STATES PATENTS

| Number | Name | Date |
|---|---|---|
| 2,189,549 | Hershberger | Feb. 6, 1940 |
| 2,407,199 | Wolff | Sept. 3, 1946 |
| 2,471,373 | Joyner | May 24, 1949 |